United States Patent
Jin et al.

(10) Patent No.: US 11,812,732 B2
(45) Date of Patent: Nov. 14, 2023

(54) SUCTION SAMPLER SYSTEM FOR IN SITU COLLECTION OF DEEP-SEA FLOOR ORGANISMS AND METHOD OF USING SAME

(71) Applicant: HUNAN UNIVERSITY OF SCIENCE AND TECHNOLOGY, Hunan (CN)

(72) Inventors: Yongping Jin, Hunan (CN); Guangping Liu, Hunan (CN); Youduo Peng, Hunan (CN); Buyan Wan, Hunan (CN); Ping Liu, Hunan (CN); Kun Xie, Hunan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 197 days.

(21) Appl. No.: 17/148,988

(22) Filed: Jan. 14, 2021

(65) Prior Publication Data
US 2021/0219528 A1 Jul. 22, 2021

(30) Foreign Application Priority Data
Jan. 19, 2020 (CN) .......................... 202010057236.4

(51) Int. Cl.
*A01K 79/00* (2006.01)
(52) U.S. Cl.
CPC ................... *A01K 79/00* (2013.01)
(58) Field of Classification Search
CPC ........ A01K 79/00; A01K 99/00; A01K 80/00; A01K 69/00; A01K 69/06; G01N 1/02
(Continued)

(56) References Cited

U.S. PATENT DOCUMENTS 1,388,414 A * 8/1921 Dros ...................... A01K 79/00
43/17.1
1,462,196 A * 7/1923 Dros ...................... A01K 79/00
43/6.5
(Continued)

FOREIGN PATENT DOCUMENTS

| CN | 100403007 C | * | 7/2008 |
| CN | 101539018 B | * | 5/2012 |

(Continued)

*Primary Examiner* — Darren W Ark

(57) ABSTRACT

A suction sampler system for in situ collection of deep-sea floor organisms includes a pressure-retaining cylinder, a pressure compensation device, a cone component, semiconductor refrigeration components, a circuit cylinder and a collection cylinder. Two ends of the pressure-retaining cylinder are respectively equipped with a first and second seal mechanisms, and the cone component is arranged in the pressure-retaining cylinder. The pressure compensation device is connected to the pressure-retaining cylinder through a high-pressure pipe. The semiconductor refrigeration components are arranged outside the pressure-retaining cylinder. The circuit cylinder is equipped with a power supply and a controller, and the semiconductor refrigeration components are connected to the controller. A pressure sensor and a temperature sensor are arranged inside the pressure-retaining cylinder, and respectively connected to the controller. The collection cylinder communicates with the valve hole of the second seal mechanism through a pipeline.

9 Claims, 7 Drawing Sheets

US 11,812,732 B2
Page 2

(58) Field of Classification Search
USPC ............................................. 43/6.5, 4, 100
See application file for complete search history.

(56) References Cited

U.S. PATENT DOCUMENTS

| | | | | |
|---|---|---|---|---|
| 2,163,282 A * | 6/1939 | Hovden | .................. | A01K 79/02 43/17.1 |
| 2,663,117 A * | 12/1953 | Ederer | .................... | A01K 69/06 43/14 |
| 2,864,195 A * | 12/1958 | Bachmann | ............... | A01K 79/02 43/4.5 |
| 3,273,276 A * | 9/1966 | Englesson | ............... | A01K 63/02 43/14 |
| 3,412,498 A * | 11/1968 | Niskin | .................... | A01K 80/00 73/170.29 |
| 3,440,752 A * | 4/1969 | Minter | .................... | A01K 73/00 43/6.5 |
| 3,461,591 A * | 8/1969 | Brown | .................... | A01K 80/00 73/863.23 |
| 3,688,433 A * | 9/1972 | Niskin | .................... | A01K 69/00 43/100 |
| 3,729,855 A * | 5/1973 | Niskin | .................... | A01K 80/00 43/9.1 |
| 3,900,982 A * | 8/1975 | Gale | ........................ | A01K 80/00 43/7 |
| 3,940,867 A * | 3/1976 | Sikich | .................... | A01K 79/00 43/6.5 |
| 4,055,087 A * | 10/1977 | Carle | ...................... | G01N 1/04 73/863.25 |
| 4,089,131 A * | 5/1978 | Phillips | .................. | A01K 80/00 285/260 |
| 4,117,726 A * | 10/1978 | McGroddy | .............. | G01N 1/10 43/6.5 |
| 4,164,199 A * | 8/1979 | Pequegnat | ............ | A01K 61/00 119/215 |
| 4,336,709 A * | 6/1982 | Meek | ....................... | G01N 1/02 73/864.31 |
| 4,399,629 A * | 8/1983 | Duncan | ................. | A01K 80/00 73/863.23 |
| 4,434,572 A * | 3/1984 | Sheldon | ................ | A01K 79/00 43/4.5 |
| 4,446,749 A * | 5/1984 | Low | ......................... | G01N 1/10 73/170.29 |
| 4,551,938 A * | 11/1985 | Sheldon | ................ | A01K 79/00 43/4.5 |
| 4,558,534 A * | 12/1985 | Phillips | .................. | A01K 80/00 43/4 |
| 4,646,577 A * | 3/1987 | Phillips | .................. | A01K 80/00 73/863.23 |
| 4,756,671 A * | 7/1988 | Grimes | .................... | F04F 1/18 43/4.5 |
| 5,018,946 A * | 5/1991 | Breckner | ............... | F04F 5/10 417/198 |
| 5,181,479 A * | 1/1993 | Hiebert | ................. | A01K 79/00 43/103 |
| 5,343,442 A * | 8/1994 | Vielberth | ............... | A01K 74/00 43/4.5 |
| 5,561,939 A * | 10/1996 | Wik | ......................... | A01K 69/06 D22/199 |
| 5,578,768 A * | 11/1996 | Phillips | .................. | A01K 80/00 73/863.52 |
| 5,768,820 A * | 6/1998 | Bentzley | ............... | A01K 79/00 43/6.5 |
| 5,899,017 A * | 5/1999 | Chen | ....................... | A01K 69/04 43/100 |
| 6,112,699 A * | 9/2000 | Saxby | ..................... | A01K 79/00 119/213 |
| 6,161,504 A * | 12/2000 | Jungling | ............... | A01K 79/00 119/226 |
| 6,343,433 B1 * | 2/2002 | Granberg | ............. | A01K 79/00 43/6.5 |
| 10,206,380 B1 * | 2/2019 | Bokelaar | ............. | A01K 69/00 |
| 11,147,251 B1 * | 10/2021 | Fu | ........................ | A01K 81/04 |
| 2001/0029694 A1 * | 10/2001 | Bodden | .................. | A01K 61/60 43/102 |
| 2002/0076468 A1 * | 6/2002 | Saxby | ..................... | C12N 9/00 426/56 |
| 2005/0284394 A1 * | 12/2005 | Lindgren | ............... | A01K 61/80 119/215 |
| 2006/0048436 A1 * | 3/2006 | Ernsten | .................. | A01K 73/02 43/6.5 |
| 2012/0267115 A1 * | 10/2012 | Brown | ................. | E21B 41/0007 166/107 |
| 2016/0278353 A1 * | 9/2016 | Martin | ................... | B63G 8/001 |
| 2019/0061890 A1 * | 2/2019 | Fiorello | .................. | B63G 8/22 |
| 2019/0202531 A1 * | 7/2019 | Wang | ..................... | A01K 99/00 |
| 2020/0015464 A1 * | 1/2020 | Hystad | .................. | F04B 47/06 |
| 2020/0337282 A1 * | 10/2020 | Toften | ................... | A01K 79/02 |
| 2021/0120792 A1 * | 4/2021 | Øvsthus | ................ | F04D 13/14 |
| 2021/0195881 A1 * | 7/2021 | Martin | ................... | A01K 79/00 |

FOREIGN PATENT DOCUMENTS

| | | | | |
|---|---|---|---|---|
| CN | 107991133 | A | * | 5/2018 |
| CN | 207741968 | U | * | 8/2018 |
| CN | 109030089 | A | * | 12/2018 ............... G01N 1/10 |
| CN | 208609725 | U | * | 3/2019 ............ A01K 69/06 |
| CN | 208676143 | U | | 4/2019 |
| CN | 209027866 | U | * | 6/2019 |
| CN | 209027868 | U | * | 6/2019 |
| CN | 110254673 | A | | 9/2019 |
| CN | 111044312 | A | * | 4/2020 |
| CN | 111076986 | A | * | 4/2020 |
| CN | 111089746 | A | * | 5/2020 |
| CN | 111089747 | A | * | 5/2020 |
| CN | 111103166 | A | | 5/2020 |
| CN | 111103166 | A | * | 5/2020 |
| CN | 111109159 | A | * | 5/2020 ............. A01K 61/10 |
| CN | 211504700 | U | * | 9/2020 |
| CN | 211504701 | U | * | 9/2020 |
| CN | 211904766 | U | * | 11/2020 |
| CN | 111284664 | B | * | 12/2020 ............. B63C 11/52 |
| CN | 112631178 | A | * | 4/2021 ............. A01K 69/06 |
| CN | 114081010 | A | * | 2/2022 |
| CN | 114081020 | A | * | 2/2022 |
| CN | 114304092 | A | * | 4/2022 |
| CN | 114451365 | A | * | 5/2022 |
| CN | 115508126 | A | * | 12/2022 |
| DE | 342675 | C | * | 10/1921 |
| DE | 1431511 | A1 | * | 3/1969 |
| DE | 3108929 | A1 | * | 2/1983 |
| DE | 102018215096 | A1 | * | 3/2020 |
| EP | 3424317 | A1 | * | 1/2019 ............. A01K 80/00 |
| FR | 1398639 | A | * | 5/1965 |
| FR | 1399321 | A | * | 5/1965 |
| FR | 2767029 | A1 | * | 2/1999 ............. A01K 79/00 |
| GB | 1119756 | A | * | 7/1968 |
| GB | 1204640 | A | * | 9/1970 |
| GB | 2444174 | A | * | 5/2008 ............. E02F 3/8841 |
| GB | 2567452 | A | * | 4/2019 ............. A01K 79/00 |
| JP | 2004049053 | A | * | 2/2004 |
| JP | 2016168936 | A | * | 9/2016 |
| JP | 2017158530 | A | * | 9/2017 |
| KR | 20060122689 | A | * | 11/2006 |
| KR | 20070000528 | U | * | 5/2007 |
| KR | 100828305 | B1 | * | 5/2008 |
| KR | 200449749 | Y1 | * | 8/2010 |
| KR | 101025410 | B1 | * | 3/2011 |
| KR | 20120034408 | A | * | 4/2012 |
| SU | 90343 | A1 | * | 11/1950 |
| SU | 490450 | A | * | 2/1976 |
| SU | 1068087 | A1 | * | 1/1984 |
| SU | 1671214 | A1 | * | 8/1991 |
| SU | 1762837 | A1 | * | 9/1992 |
| WO | WO-2011019290 | A3 | * | 6/2011 ............. A01K 80/00 |
| WO | WO-2016096832 | A1 | * | 6/2016 ............ A01D 44/00 |
| WO | WO-2017042785 | A1 | * | 3/2017 |
| WO | WO-2018094541 | A1 | * | 5/2018 |
| WO | WO-2018160053 | A1 | * | 9/2018 ............. A01K 63/00 |
| WO | WO-2018174723 | A1 | * | 9/2018 ............. A01K 73/00 |

(56) References Cited

FOREIGN PATENT DOCUMENTS

| WO | WO-2019083375 A1 | * | 5/2019 | ............ A01K 79/00 |
| WO | WO-2019101830 A1 | * | 5/2019 | ............ A01K 69/08 |
| WO | WO-2019135070 A1 | * | 7/2019 | ............ A01K 79/00 |
| WO | WO-2020029611 A1 | * | 2/2020 | ............ A01K 69/06 |
| WO | WO-2020104431 A1 | * | 5/2020 | ............ A01K 61/90 |

* cited by examiner

SUCTION SAMPLER SYSTEM FOR IN SITU COLLECTION OF DEEP-SEA FLOOR ORGANISMS AND METHOD OF USING SAME

CROSS-REFERENCE TO RELATED APPLICATIONS

This application claims the benefit of priority from Chinese Patent Application No. 202010057236.4, filed on Jan. 19, 2020. The content of the aforementioned application, including any intervening amendments thereto, is incorporated herein by reference in its entirety.

TECHNICAL FIELD

The present application relates to a deep-sea floor organism sampling device, and more particularly to a suction sampler system for in situ collection of deep-sea floor organisms and a method of using the same.

BACKGROUND

There are a large number of biotic communities on the deep-sea floor. Scientific research on the organisms living on the seafloor is an important means for mankind to understand and study the evolution of marine life and the seabed environment. It is being considered as a big issue to collect organism samples in the sea at different depths through fast, convenient and efficient collection of the deep-sea floor creatures for competition in marine resources, based on the full understanding of biological resources in specific sea areas. At present, the in situ collection technique for deep-sea floor organisms falls behind in China, mainly due to the lack of effective deep-sea organism sampling methods. The sampling methods for deep-sea floor organisms in China are Television (TV) grabs and Remotely Operated Vehicles (ROVs), but these two methods can only collect organisms with a fixed attachment or a weak athletic ability, and cannot maintain the in situ pressure and temperature of the deep sea, resulting in death of the collected larvae during the recovery from the seabed to the mother ship on the ocean surface, which will have a great impact on the living conditions of the seabed area and the precise study of the seabed environment.

Therefore, it is urgent to develop a suction sampler system for in situ collection of deep-sea floor organisms with a simple structure, a convenient operation and a high reliability.

SUMMARY

In order to solve the above-mentioned technical defects, the present disclosure provides a suction sampler system for in situ collection of deep-sea floor organisms and a method of using same, in which the deep-sea floor organisms are sucked into the suction sampler system by controlling the rotation of the propeller; a pressure compensator is provided for passive pressure preservation; and a semiconductor refrigeration chip is provided for active cooling, so that the collected samples can maintain their in situ characteristics.

The technical solutions of the disclosure are described as follows.

In a first step, the present disclosure provides a suction sampler system for in situ collection of deep-sea floor organisms, comprising:
a pressure-retaining cylinder;
a pressure compensation device;
a cone component;
a semiconductor refrigeration component;
a circuit cylinder; and
a collection cylinder;
wherein one end of the pressure-retaining cylinder is provided with a first seal mechanism, and the other end of the pressure-retaining cylinder is provided with a second seal mechanism; the first seal mechanism is provided with a first valve hole, and the second seal mechanism is provided with a second valve hole; the first valve hole and the second valve hole are both in communication with a cavity of the pressure-retaining cylinder; the first seal mechanism is connected to a guide cover or a water pump; a propeller is arranged in the guide cover; the propeller or the water pump is connected to a controller in the circuit cylinder; a central hole or a cavity of the water pump is in communication with the first valve hole of the first seal mechanism;
the cone component is arranged in the cavity of the pressure-retaining cylinder; the pressure compensation device is in communication with the pressure-retaining cylinder through a high-pressure pipe;
the semiconductor refrigeration component is arranged on an outer wall of the pressure-retaining cylinder;
the circuit cylinder is provided with a power supply and the controller; the semiconductor refrigeration component is connected to the controller; the power supply is connected to the controller; an inner wall of the pressure-retaining cylinder is provided with a pressure sensor and a temperature sensor; the pressure sensor and the temperature sensor are respectively connected to the controller; and the collection cylinder is in communication with the second valve hole of the second seal mechanism through a pipeline.

In an embodiment, the first seal mechanism comprises:
a flap valve seat;
a flap valve cover;
a flap shaft;
a first sealing ring;
a torsion spring;
a sleeve; and
a first trigger mechanism;
wherein the flap valve seat is provided with the first valve hole that communicates with the cavity of the pressure-retaining cylinder; the first valve hole is provided with a hinge lug; the flap shaft is fixedly arranged on the hinge lug; the flap valve cover is hinged with the hinge lug via the flap shaft; the flap shaft is fitted with the torsion spring; one end of the torsion spring is connected to the flap valve seat, and the other end of the torsion spring is connected to the flap valve cover; the sleeve is arranged on the flap valve cover; the sleeve cooperates with the first trigger mechanism to limit the flap valve cover, so that the flap valve cover in an initial position is upright in the cavity of the pressure-retaining cylinder; the flap valve seat is sealedly connected to the pressure-retaining cylinder; and the flap valve cover and the flap valve seat are sealed via the first sealing ring.

In an embodiment, the first trigger mechanism is arranged on a side wall of the pressure-retaining cylinder; the first trigger mechanism comprises a first trigger rod and a first trigger rope; one end of the first trigger rod is connected to the first trigger rope, and the other end of the first trigger rod passes through a mounting hole of the first trigger rod on the side wall of the pressure-retaining cylinder and inserts into the sleeve; and a second sealing ring is arranged between the first trigger rod and the mounting hole of the first trigger rod.

In an embodiment, the pressure compensation device is arranged on the side wall of the pressure-retaining cylinder; the pressure compensation device comprises a pressure-resistant cylinder, a piston, a compensator end cover and an inflation valve; the compensator end cover is sealedly arranged at a top opening of the pressure-resistant cylinder; the compensator end cover is provided with a through hole, and is connected to the cavity of the pressure-retaining cylinder through the high-pressure pipe; the piston is placed in the pressure-resistant cylinder; a bottom of the pressure-resistant cylinder is provided with an inflation hole; the inflation hole is connected to an inflation pipe; and the inflation pipe is provided with the inflation valve.

In an embodiment, the cone component comprises an inverted cone body, a screw rod, a driving bevel gear, a driven bevel gear, and a rocker; the plurality of beards are connected to one end of the screw rod, and the other end of the screw rod is connected to the driven bevel gear; the rocker is arranged on the side wall of the pressure-retaining cylinder along a radial direction of the pressure-retaining cylinder; an inner end of the rocker is provided with the driving bevel gear meshing with the driven bevel gear; and a rocker handle is provided on an outer end of the rocker.

In an embodiment, the second seal mechanism comprises:
a flap valve seat;
a flap valve cover;
a sealing ring;
a torsion spring; and
a flap shaft;
wherein the flap valve seat is provided with the second valve hole that communicates with the cavity of the pressure-retaining cylinder; the second valve hole is provided with the flap shaft; the flap valve cover is hinged with the flap valve seat through the flap shaft to form a hinge joint; a gear is at the hinge joint between the flap valve cover and the flap valve seat; the gear meshes with a rack; an inflation seat is arranged on a side wall of the pressure-retaining cylinder; a rack hole is arranged on the inflation seat; an outer end of the rack is placed in the rack hole; the sealing ring is arranged between the rack and the rack hole; an inflation inlet is provided on a side wall of the inflation seat; the inflation inlet is connected to the rack hole; the torsion spring is arranged on the flap shaft; two ends of the torsion spring are respectively connected to the flap valve seat and the flap valve cover; and the flap valve seat and the pressure-retaining cylinder are sealed via the sealing ring.

In an embodiment, the flap valve cover is provided with a second sleeve; the pressure-retaining cylinder is provided with a second trigger mechanism corresponding to the flap valve cover; the second trigger mechanism comprises a second trigger rod and a second trigger rope; one end of the second trigger rod is connected to the second trigger rope, and the other end of the second trigger rod passes through a mounting hole of the second trigger rod on the side wall of the pressure-retaining cylinder and inserts into the second sleeve; and the sealing ring is arranged between the second trigger rod and the mounting hole of the second trigger rod.

In an embodiment, there are two groups of semiconductor refrigeration components; a cross section of each of the two groups of semiconductor refrigeration components is a semi-circular ring; the two groups of semiconductor refrigeration components are bonded to the outer wall of the pressure-retaining cylinder via thermally conductive silicone; the two groups of semiconductor refrigeration components form a structure with a circular cross section; each of the two groups of the semiconductor refrigeration components comprises a plurality stages of semiconductor refrigeration plates and an electrode holder; a cold end of each of the plurality stages of semiconductor refrigeration plates is connected to the outer wall of the pressure-retaining cylinder via a heat conductive plate; a hot end of each of the plurality stages of the semiconductor refrigeration plates is provided with a heat sink; each group of semiconductor refrigeration components comprises the plurality stages of semiconductor refrigeration plates, and the semiconductor refrigeration plate in each stage is connected to an electrode holder; the electrode holders are connected in series through wires; and the wires are connected to the power supply in the circuit cylinder.

In an embodiment, the semiconductor refrigeration plates are sandwiched between the heat conductive plate and the heat sink; a contact surface between the semiconductor refrigeration plate and the heat conductive plate, and a contact surface between the semiconductor refrigeration plate and the heat sink are both coated with thermally conductive silicone grease; the electrode holders and the semiconductor refrigeration components are connected through wires; and each of the electrode holders and each group of the semiconductor refrigeration components are sealed via an O-ring.

In an embodiment, the pipeline communicating an outlet of the collection cylinder with the second valve hole of the second seal mechanism is a hose; an inlet of the collection cylinder is an opening with a slope; an upper end of the collection cylinder is provided with a T-shaped handle; the collection cylinder is provided with a filter plate to provide passage of the deep-sea floor organisms within a predetermined size range; a diameter of a filter hole on the filter plate is smaller than a diameter of the pipeline; and an inner diameter of the pressure-retaining cylinder is equal to an inner diameter of the pipeline.

In a second aspect, the present disclosure further provides a method for using any one of the above-mentioned suction sampler system for in situ collection of deep-sea floor organisms, comprising:
(1) before running the suction sampler system into water, opening the first valve hole of the first seal mechanism and the second valve hole of the second seal mechanism; inflating a cavity under the piston of the pressure compensator with inert gas 0.3 times a pressure of water at a deep-sea floor collection point to keep the piston of the pressure compensator at a top of the cavity of the pressure compensator; arranging the semiconductor refrigeration component on the outer wall of the pressure-retaining cylinder, and connecting a circuit to power on; fixing the suction sampler system on a submersible sampling basket; placing bait in a net; and arranging the net on the submersible sampling basket;
(2) lowering the suction system by a submersible to a specified seabed surface;
(3) controlling the propeller or the water pump by a controller to operate, and using a manipulator on the submersible to grab the collection cylinder to make an entrance of the collection cylinder aim at deep-sea floor organisms observed and then suck them into the pressure-retaining cylinder;
(4) after completing sampling of the suction sampler system, pulling the first trigger rope of the first trigger mechanism and the second trigger rope of the second trigger mechanism by the manipulator to close the first seal mechanism and the second seal mechanism;

(5) recovering the suction sampler system using the submersible to the sea surface, during which an external seawater pressure decreases so, the pressure sensor sends a real-time pressure signal and an input terminal of the controller receives the real-time pressure signal from the pressure sensor, and the pressure-retaining cylinder expands and deforms, and the inert gas in a cavity below the piston of the pressure compensator pushes the piston to move to an upper cavity, forcing seawater in a cavity above the piston flow into the pressure-retaining cylinder through the high-pressure pipe to compensate a pressure loss inside the pressure-retaining cylinder due to an expansion and deformation of the pressure-retaining cylinder;

during the recovery process of the suction sampler system to the sea surface, due to an increase of an outside sea temperature, sending out a real-time temperature signal by the temperature sensor; receiving the real-time temperature signal from the temperature sensor by the input terminal of the controller; outputting an control signal by an output terminal of the controller, to control a working current in the semiconductor refrigeration plate to control the cooling power; controlling the cold end of each of the semiconductor refrigeration plates to keep the temperature in the pressure-retaining cylinder the same as a temperature value at a collection point in the deep-sea floor through the heat conductive plate, and transferring the heat to the seawater through the heat sink by the hot end of each of the semiconductor refrigeration plates; and (6) transferring the deep-sea floor organisms in the suction sampler system; during a transfer process of the deep-sea floor organisms, first connecting the suction sampler system to a culture tank, and connecting the suction sampler system to the inflation inlet through a pressure pump; pressurizing the pressure-retaining cylinder to a pressure greater than a water pressure of the collection point in the deep-sea floor by 0.3-0.7 MPa; opening the second valve hole of the second seal mechanism; stopping a pressurization process; driving the inverted cone body move upward, and driving the deep-sea floor organisms in the pressure-retaining cylinder to move into the culture tank.

Compared to the prior art, the present invention has following beneficial effects.

(1) The suction sampler system for in situ collection of deep-sea floor organisms of present invention can realize trapping and heat preservation and pressure-keeping culture of deep-sea floor organisms, effectively ensuring the in situ life characteristics of deep-sea floor organisms;

(2) In the present invention, the deep-sea floor organisms can be sucked into the suction sampler system through a rotation of the propeller, realizing a collection of different kinds of organisms with high collection efficiency;

(3) The suction sampler system of the present invention can be connected to the culture tank to realize a heat-preservation and pressure-keeping transfer for the deep-sea floor organisms;

(4) In the present invention, semiconductor refrigeration plates are adopted for active heat preservation, to effectively ensure the living environment of the deep-sea floor organisms, thereby ensuring their in situ life characteristics;

(5) The suction sampler system of present invention has advantages of simple and compact in structure, easy to operate, and convenient to be mounted on manned submersibles or unmanned submersibles.

DETAILED DESCRIPTION OF EMBODIMENTS

Figure 1:
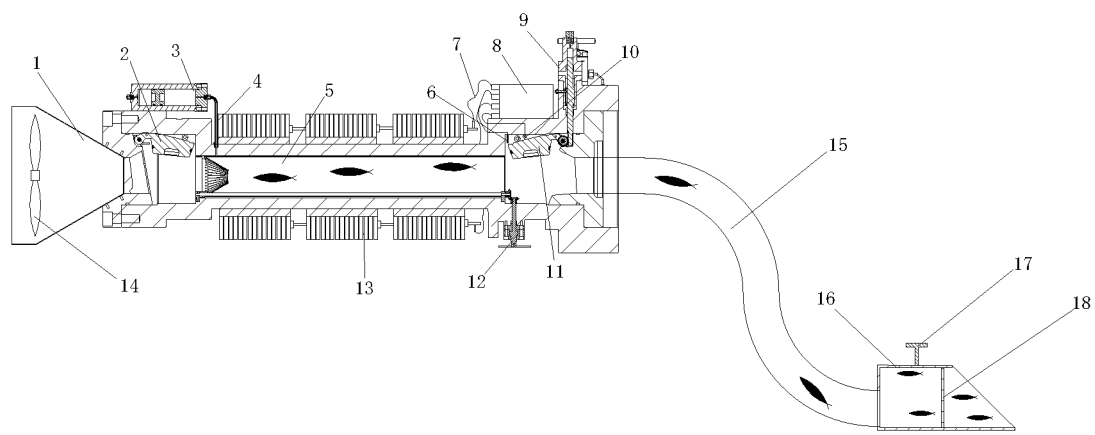
FIG. 1 is a schematic diagram of a suction sampler system for in situ collection of deep-sea floor organisms in a sampling process according to an embodiment of the present disclosure.
Figure 2:
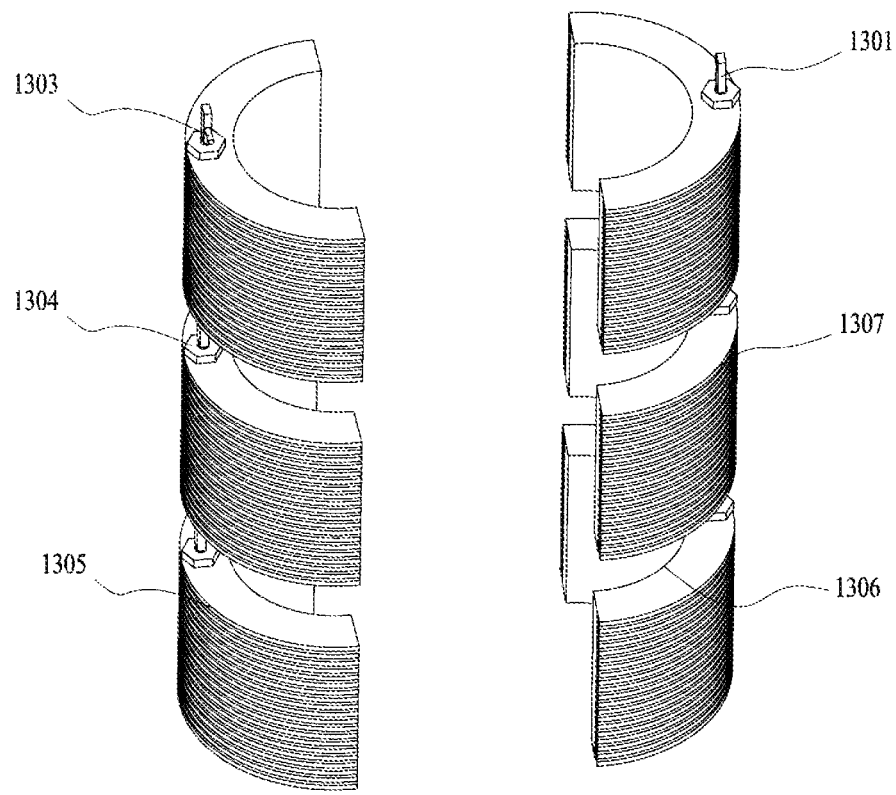
FIG. 2 is a three-dimensional schematic diagram of a refrigeration component according to an embodiment of the present disclosure.
Figure 3:
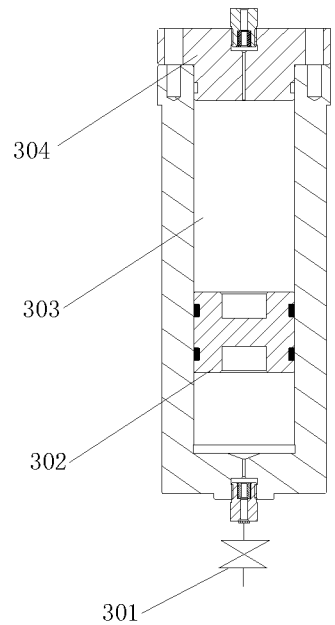
FIG. 3 is a schematic diagram of the pressure compensator according to an embodiment of the present disclosure.
Figure 4:
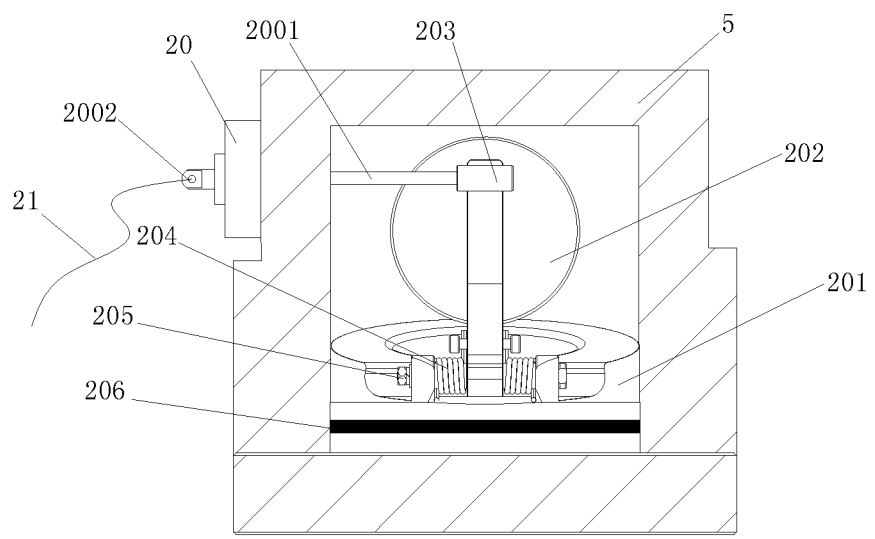
FIG. 4 is a schematic diagram of a first seal mechanism in a open state according to an embodiment of the present disclosure.
Figure 5:
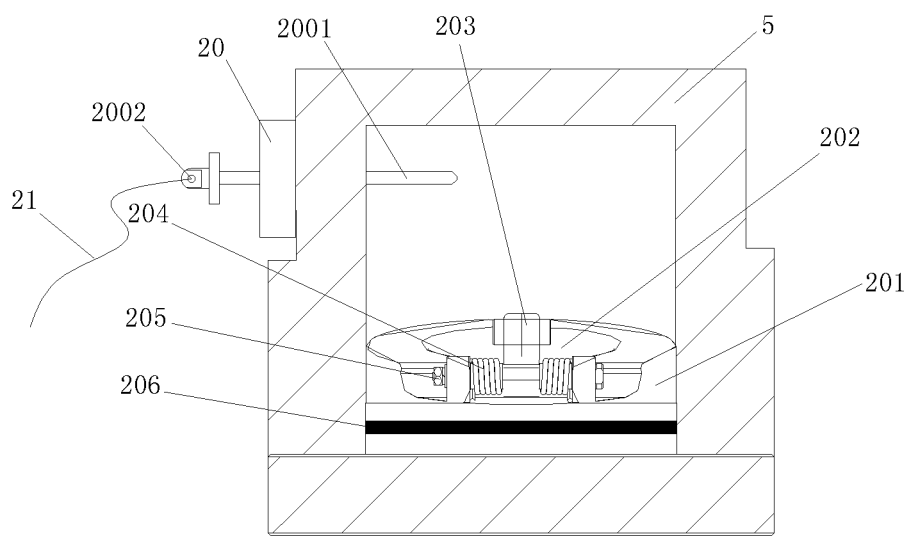
FIG. 5 is a schematic diagram of the first seal mechanism in a closed state according to an embodiment of the present disclosure.
Figure 6:
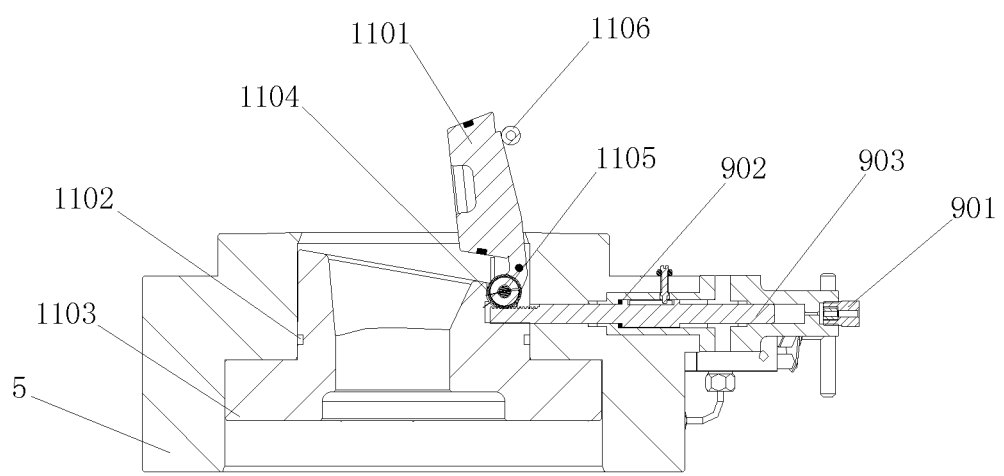
FIG. 6 is a schematic diagram of an outlet seal mechanism and a gear mechanism according to an embodiment of the present disclosure.
Figure 7:
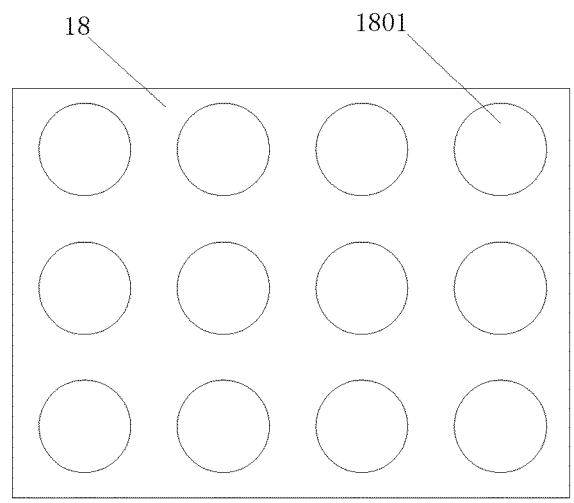
FIG. 7 is a schematic diagram of a filter plate according to an embodiment of the present disclosure.
Figure 8:
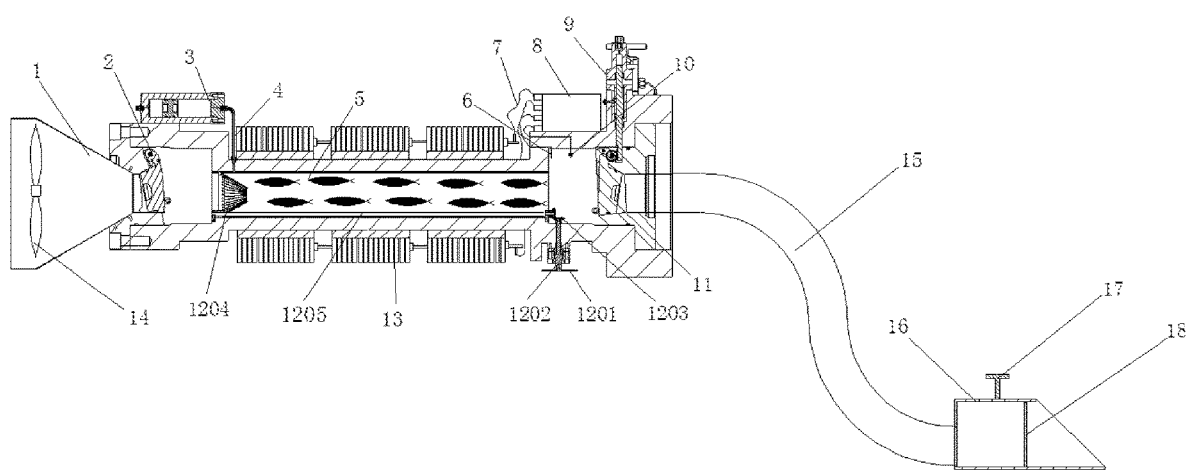
FIG. 8 is a schematic diagram of the suction sampler system for in situ collection of deep-sea floor organisms after the sampling process according to an embodiment of the present disclosure.

The present disclosure will be further described in detail in conjunction with the accompanying drawings.

As shown in FIGS. 1-13, the embodiment provides a suction sampler system for in situ collection of deep-sea floor organisms, including a pressure-retaining cylinder 5, a first seal mechanism 2, a pressure compensation device 3, a cone component 12, a guide cover 1, a propeller 14, a second seal mechanism 11, a gear mechanism 9, a semiconductor refrigeration component 13, a circuit cylinder 8, a temperature sensor 6, a pressure sensor 10, and a collection cylinder 16. The first seal mechanism 2 is arranged at one end of the pressure-retaining cylinder 5, and the second seal mechanism 11 is arranged at the other end of the pressure-retaining cylinder 5. The first seal mechanism 2 is provided with a first valve hole communicating with a cavity of the pressure-retaining cylinder 5, and the second seal mechanism 11 is provided with a second valve hole communicating with the cavity of the pressure-retaining cylinder 5.

The first seal mechanism 2 includes a flap valve seat 201, a flap valve cover 202, a flap shaft 205, a first sealing ring 206, a torsion spring 204 and a sleeve 203. The flap valve seat 201 is provided with a hinge lug, and the flap shaft 205 is fixedly arranged on the hinge lug. The flap valve cover 202 is hinged with the flap valve seat 201 via the flap shaft 205 and the hinge lug. The flap shaft 205 is further provided with the torsion spring 204, and two end of the torsion spring 204 are respectively connected to the flap valve seat 201 and the flap valve cover 202. The sleeve 203 is arranged on the flap valve cover 202, to cooperate with a first trigger mechanism 20 to limit the flap valve cover 202, so that the flap valve cover 202 is upright in the cavity of the pressure-retaining cylinder 5. The flap valve seat 201 is sealedly connected to the pressure-retaining cylinder 5 via bolts, and the flap valve cover 202 and the flap valve seat 201 are sealed via the first sealing ring 206.

The first trigger mechanism 20 is arranged on the side wall of the pressure-retaining cylinder 5. The first trigger mechanism 20 includes a first trigger rod 2001 and a first trigger rope 21. One end of the first trigger rod 2001 is provided with a fixed hole 2002 of the first trigger rope. The fixed hole 2002 is connected to one end of the first trigger rope 21, and the other end of the first trigger rod 2001 passes through an installation hole of the first trigger mechanism on the side wall of the pressure-retaining cylinder 5 and inserts into the sleeve 203. The first trigger rod 2001 and the installation hole of the trigger rod are sealed by a second sealing ring.

A guide cover 1 is arranged at a bottom of the first seal mechanism 2, and a propeller 14 is arranged in the guide cover 1, where the propeller 14 rotates to form a pumping effect and suck seabed organisms into the pressure-retaining cylinder 5. The pressure compensation device 3 is fixedly arranged on the side wall of the pressure-retaining cylinder. The pressure compensation device 3 includes a pressure-resistant cylinder 303, a piston 302, a compensator end cover 304, and an inflation valve 301. The compensator end cover 304 is sealedly arranged at a top opening of the pressure-resistant cylinder 303. The compensator end cover 304 is provided with a through hole, and communicates with the pressure-retaining cylinder 5 through the high-pressure pipe 4. The piston 302 is placed in a pressure-resistant cylinder 303. A bottom of the pressure-resistant cylinder 303 is provided with an inflation hole, and the inflation hole is connected with another high-pressure pipe, and an inflation valve 301 is provided on the another high-pressure pipe.

The cone component 12 is arranged in the cavity of the pressure-retaining cylinder 5. The cone component 12 includes an inverted cone 1204 with a small top and a large bottom, a rocker 1202, and a screw rod 1205. The plurality of beard 1204 are arranged on one end of the screw rod 1205, and a driven bevel gear is arranged on the other end of the screw rod 1205. A rocker handle 1201 is arranged at one end of the rocker 1202, and the other end of the rocker 1202 extends into the cavity of the pressure-retaining cylinder 5 and arranges with a driving bevel gear 1203. The driving bevel gear 1203 meshes with the driven bevel gear. Through an engagement of the driving bevel gear 1203 and the driven bevel gear, rotating the rocker handle 1201 can realize a rotation of the screw rod 1205, thereby realizing a translation of the beards 1204 along the screw rod 1205, and a transfer of the seabed organisms from the guide cover 1.

The second seal mechanism 11 includes a flap valve seat 1103, a flap valve cover 1101, a sealing ring 1102, a torsion spring 1104, a flap shaft 1105 and a sleeve 1106. The flap valve seat 1103 is provided with a second valve hole. The second valve hole is provided with the flap shaft 1105. The flap valve cover 1101 is hinged with the flap valve seat 1103 through the flap shaft 1105 to form a hinge joint, and the flap valve cover 1101 rotates around the flap shaft 1105. The flap valve cover 1101 is provided with a gear at the hinge joint with the flap valve seat 1103, and the gear meshes with the rack 903. The side wall of the pressure-retaining cylinder is equipped with an inflation seat, and the inflation seat is provided with a rack hole. An outer end of the rack 903 is placed in the rack hole, and the sealing ring 902 is provided between the rack and the rack hole. An inflation inlet 901 is provided on the side wall of the inflation seat, and the inflation inlet 901 communicates with the rack hole. The torsion spring is arranged on the flap shaft, and two ends of the torsion spring are respectively connected to the flap valve seat and flap valve cover. The flap valve seat 1103 is sealed with the pressure-retaining cylinder 5 through the sealing ring 1102. The sleeve 1106 is fixedly arranged on the flap valve cover 1101, and the flap valve cover 1101 can be limited by the second trigger mechanism. The second trigger mechanism includes a second trigger rod and a second trigger rope. One end of the second trigger rod is connected to the second trigger rope, and the other end of the second trigger rod passes through a mounting hole of the second trigger rod on the side wall of the pressure-retaining cylinder and inserts into the sleeve, so that the flap valve cover 1101 stand upright on one side of the pressure-retaining cylinder 5 in advance. A sealing ring is arranged between the second trigger rod and the mounting hole of the trigger rod.

There are two groups of the semiconductor refrigeration components 13, and the cross section of the semiconductor refrigeration components is a semicircular ring. The two sets of semiconductor refrigeration components 13 are bonded to an outer wall of the pressure-retaining cylinder through thermally conductive silicone to form a structure with a circular cross section. Each group of semiconductor refrigeration components includes three stages semiconductor refrigeration plates 1307, and the semiconductor refrigeration plates 1307 are sandwiched between the heat conductive plate 1306 and the heat sink 1305. The contact surface between the semiconductor refrigeration plates 1307 and the heat conductive plate 1306, and the contact surface between the semiconductor refrigeration plates 1307 and the heat sink 1305 are both coated with thermally conductive grease. The heat conductive plate is made of materials with high thermal conductivity, so that the heat can be transferred evenly and efficiently. A cold end of each semiconductor refrigeration plate 1307 is connected to the outer wall of the pressure-retaining cylinder 5 through the heat conductive plate 1306, and a hot end of each semiconductor refrigeration plate 1307 is connected to the heat sink 1305. The heat sink 1305 is in contact with seawater to dissipate heat. The semiconductor refrigeration plate 1307 in each stage is connected to an electrode holder 1301. Each electrode holders 1301 and each semiconductor refrigeration plate 1307 are connected through a wire 1303 and a coupling nut 1304. The electrode holders 1301 are connected in series through the wire 1303, and the wire 1303 is connected to a power of the circuit cylinder 8 through a watertight cable 7.

The circuit cylinder 8 is arranged on the outer wall of the pressure-retaining cylinder 5, and a power supply and a controller are provided in the circuit cylinder 8. The power supply is provided for supplying power to the semiconductor refrigeration components 13, the controller, the temperature sensor 6, and the pressure sensor 10. The pressure sensor 10 and the temperature sensor 6 are arranged on the inner wall of the pressure-retaining cylinder 5. The pressure sensor 10 and the temperature sensor 6 are connected to the controller, and the controller is connected to a power source. The inner wall of the pressure-retaining cylinder is provided with a temperature sensor 6 and a pressure sensor 10, for collecting real-time temperature information and pressure information in the pressure-retaining cylinder 5, respectively.

Figure 9:
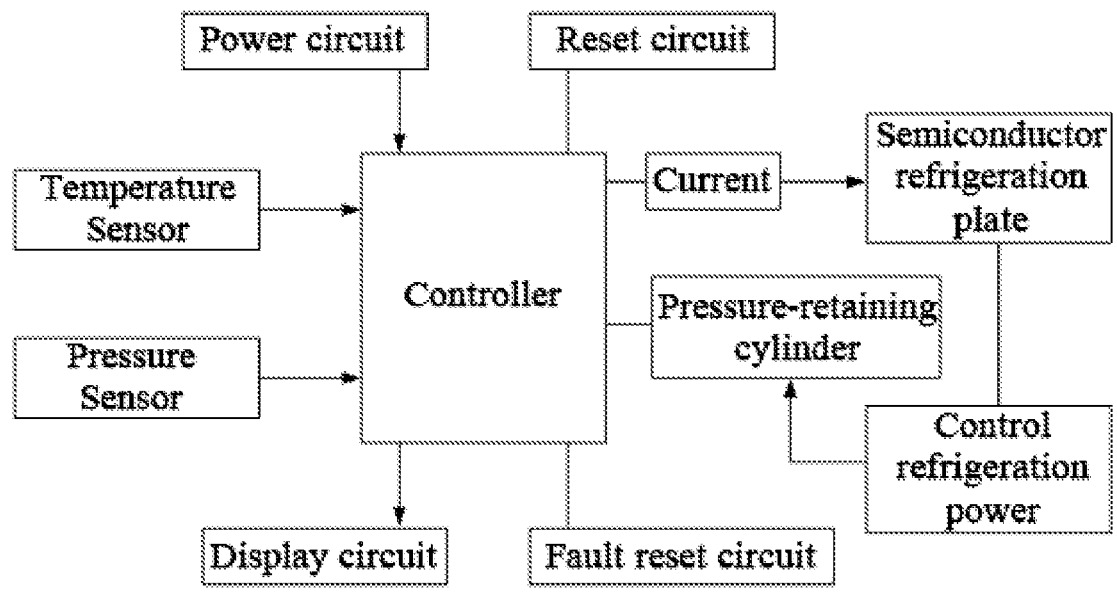
FIG. 9 is a block diagram of a circuit structure according to an embodiment of the present disclosure.
Figure 10:
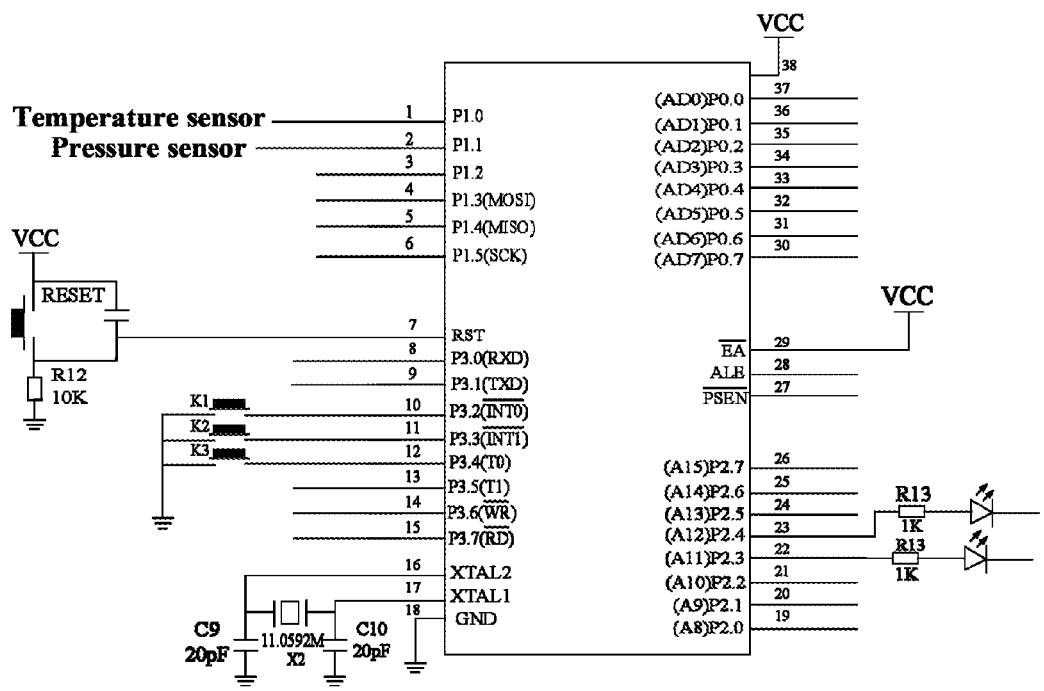
FIG. 10 is a circuit diagram of a controller according to an embodiment of the present disclosure.
Figure 11:
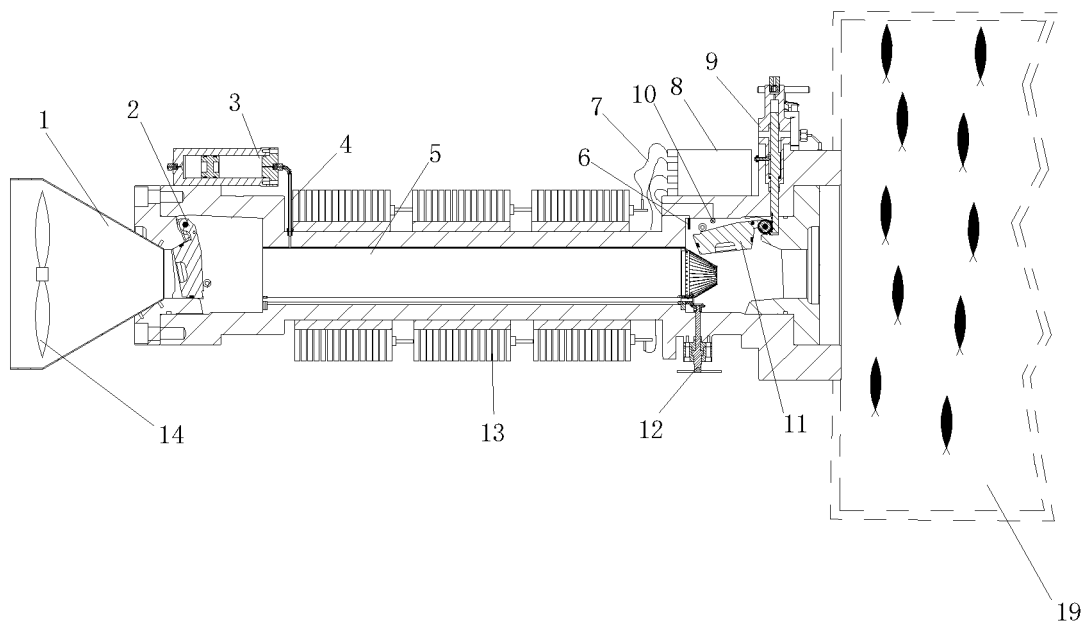
FIG. 11 is a state diagram of the suction sampler system for in situ collection of deep-sea floor organisms in a transfer process according to an embodiment of the present disclosure.

As shown in FIGS. 9-10, a model of the main control chip of the controller is STC89C51. In FIG. 10, and P1.0 is used as a temperature signal inlet and is connected to the temperature sensor 6. P1.1 is used as a pressure signal inlet and is connected to the pressure sensor 10. P2.3 is used as a current increase output terminal, and P2.4 is used as a current decrease output terminal. Ports K1, K2, and K3 are respectively used as an input of the button SET, the button DOWN, and the button UP, so that the pulse sending frequency can be manually controlled, processed by a single-chip microcomputer and converted into a corresponding pulse signal to control the working current of the semiconductor refrigeration chip 1307, and further control the cooling power, achieving a heat preservation effect. The actual temperature signal measured by P1.0 is compared with the temperature signal given by the single-chip microcomputer, so that the working current of the semiconductor refrigeration chip 1307 is adjusted through PID control.

The collection cylinder 16 communicates with the second seal mechanism 11 through a pipeline 15, and the pipeline 15 is a hose. The collection cylinder 16 is constructed with an opening with a certain slope, and an upper end surface of the collection cylinder 16 is provided with a T-shaped handle 17 for being held by the submersible. The collection cylinder is provided with a filter plate 18 to provide passage of the deep-sea floor organisms within a pre-determined size range. A diameter of the filter hole 1801 on the filter plate 18 is smaller than a diameter of the pipeline 15. The inner diameter of the pressure-retaining cylinder 5 is equal to an inner diameter of the pipeline 15. The propeller 14 is arranged in the guide cover 1 and connected to the controller in the circuit cylinder 8 through a watertight cable 7. The guide cover 1 are provided for reducing the vortex loss behind the propeller 14 and protecting the water tightness of a terminal of the propeller.

Figure 12:
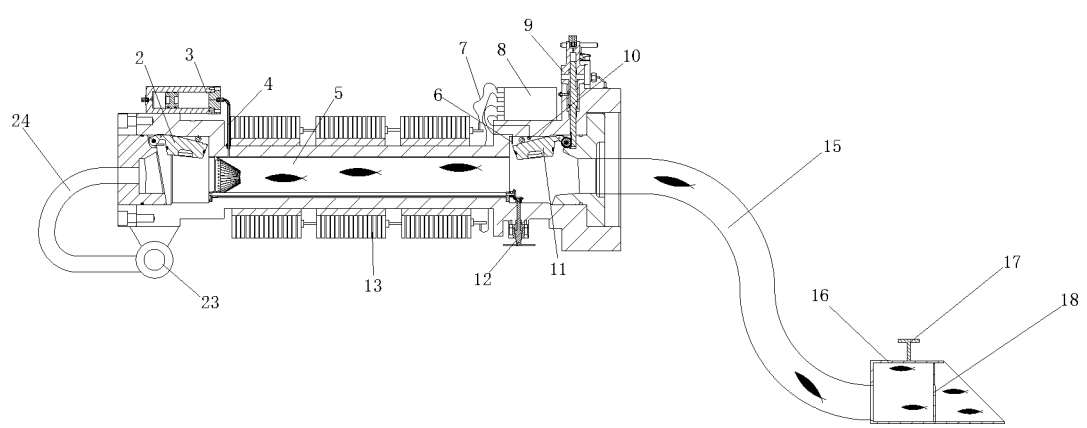
FIG. 12 is a schematic diagram of the suction sampler system for in situ collection of deep-sea floor organisms in the sampling process according to an embodiment of the present disclosure.
Figure 13:
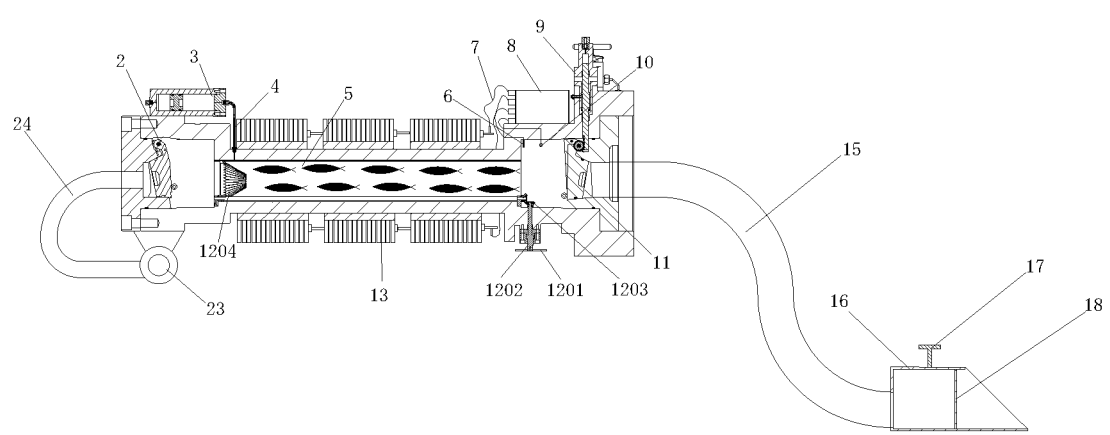
FIG. 13 is a schematic diagram of the suction sampler system for in situ collection of deep-sea floor organisms after the sampling process according to an embodiment of the present disclosure.

As shown in FIGS. 12-13, in the embodiment, the propeller 14 is replaced with a water pump 23, and the guide cover 1 is replaced with a conduit 24. The water pump communicates with the second seal mechanism 2 through the conduit. The water pump is arranged on an outer wall of the pressure-retaining cylinder, and is connected to the controller of the circuit barrel 8 through a watertight cable 7. The controller controls the water pump 23 to operate, and the manipulator on the submersible grabs the T-shaped handle 17 on the collection cylinder 16, so that an entrance of the collection cylinder 16 is aligned with the deep-sea floor organisms observed. Through the work of the water pump 23, the deep-sea floor organisms are sucked into pressure-retaining cylinder 5.

The embodiment further provides a method for using the above-mentioned suction sampler system for in situ collection of deep-sea floor organisms, including the following steps.

(1) Before running the suction sampler system into water, the first seal mechanism and the second seal mechanism are open. The cavity under the piston 302 of the pressure compensator 3 is inflated with inert gas 0.3 times the pressure of water at the deep-sea floor collection point, to keep the piston 302 of the pressure compensator 3 at a top of the pressure compensator cavity. The semiconductor refrigeration component is arranged on the outer wall of the pressure-retaining cylinder, and a circuit is connected to power on. The suction sampler system is fixed on a submersible sampling basket; the bait is placed in a net; and the net is arranged on the submersible sampling basket.

(2) The suction sampler system is lowered to a specified seabed surface by using a submersible. During the lowering process, under the action of seawater pressure, the piston 302 of the pressure compensator 3 moves downwards until the pressure in the cavity below the piston 302 and the pressure in the cavity above the piston 302 reach equilibrium.

(3) The propeller 14 or the water pump 23 is controlled to operate by a controller, and a manipulator on the submersible is adopted to grab the T-shaped handle 17 on the collection cylinder 16, to make an entrance of the collection cylinder 16 aim at deep-sea floor organisms observed and then suck the deep-sea floor organisms into the pressure-retaining cylinder 5.

(4) After completing sampling of the suction sampler system, the first trigger rope of the first trigger mechanism 20 and the second trigger rope of the second trigger mechanism are pulled by the manipulator to close the first seal mechanism and the second seal mechanism.

(5) The suction sampler system is recovered to the sea surface by using the submersible. During the recovery process, due to the decrease of the external seawater pressure, the pressure sensor 10 sends a pressure signal, and the real-time pressure signal from the pressure sensor 10 is received by an input terminal of the controller. The inert gas in the cavity below the piston 302 of the pressure compensator 3 pushes the piston 302 moves to the upper cavity, forcing the seawater in the cavity above the piston 302 to flow into the pressure-retaining cylinder 5 through the high-pressure pipe 4, thereby compensating a pressure loss inside the pressure-retaining cylinder 5 due to an expansion and deformation of the pressure-retaining cylinder 5.

During the recovery process of the suction sampler system to the sea surface, due to an increase of an outside sea temperature, the temperature sensor 6 sends out a real-time temperature signal, and the real-time temperature signal from the temperature sensor is received by an input terminal of the controller. A control signal is outputted by an output terminal of the controller, to control a working current in the semiconductor refrigeration plates 1307 to control the cooling power. A cold end of each semiconductor refrigeration plate 1307 is controlled to keep the temperature in the pressure-retaining cylinder at the same temperature value as a collection point of the deep-sea floor through the heat conductive plate 1306. And a hot end of each semiconductor refrigeration plate 1307 transfers the heat to the seawater through the heat sink.

(6) The deep-sea floor organisms in the suction sampler system are transferred. During a transfer process of the deep-sea floor organisms, the suction sampler system is firstly connected to a culture tank 19, and connected to the inflation inlet 901 on the inflation seat through a pressure pump. The pressure-retaining cylinder 5 is pressurized to a pressure greater than the water pressure at the collection point in the deep-sea floor by 0.3-0.7 MPa, so that the gear mechanism 9 is driven to open the second seal mechanism 11. The pressurization process is stopped when the pressure in the pressure-retaining cylinder 5 is the same as that in the culture tank 19. The rocker handle 1201 of the cone component 12 is rotated to drive the bevel gear 1203 to rotate, causing the beards 1204 to move upward, and drive the organisms in the pressure-retaining cylinder 5 to the culture tank 19, thereby completing the transfer of the deep-sea floor organisms.

What is claimed is:

1. A suction sampler system for in situ collection of deep-sea floor organisms, comprising:
    a pressure-retaining cylinder;
    a pressure compensation device;
    a cone component;
    a semiconductor refrigeration component;
    a circuit cylinder; and
    a collection cylinder;
    wherein one end of the pressure-retaining cylinder is provided with a first seal mechanism, and an other end of the pressure-retaining cylinder is provided with a second seal mechanism; the first seal mechanism is provided with a first valve hole, and the second seal mechanism is provided with a second valve hole; the first valve hole and the second valve hole are both in communication with a cavity of the pressure-retaining cylinder; the first seal mechanism is connected to a guide cover or a water pump; a propeller is arranged in the guide cover; the propeller or the water pump is connected to a controller in the circuit cylinder; a central hole or a cavity of the water pump is in communication with the first valve hole of the first seal mechanism;
    the cone component is arranged in the cavity of the pressure-retaining cylinder; the pressure compensation device is in communication with the pressure-retaining cylinder through a high-pressure pipe;
    the semiconductor refrigeration component is arranged on an outer wall of the pressure-retaining cylinder;
    the circuit cylinder is provided with a power supply and the controller; the semiconductor refrigeration component is connected to the controller; the power supply is connected to the controller; an inner wall of the pressure-retaining cylinder is provided with a pressure sensor and a temperature sensor; the pressure sensor and the temperature sensor are respectively connected to the controller; and the collection cylinder is in communication with the second valve hole of the second seal mechanism through a pipeline.

2. The suction sampler system of claim 1, wherein the first seal mechanism comprises:
    a flap valve seat;
    a flap valve cover;
    a flap shaft;
    a first sealing ring;
    a torsion spring;
    a sleeve; and
    a first trigger mechanism;
    wherein the flap valve seat is provided with the first valve hole that communicates with the cavity of the pressure-retaining cylinder; the first valve hole is provided with a hinge lug; the flap shaft is fixedly arranged on the hinge lug; the flap valve cover is hinged with the hinge lug via the flap shaft; the flap shaft is fitted with the torsion spring; one end of the torsion spring is connected to the flap valve seat, and an other end of the torsion spring is connected to the flap valve cover; the sleeve is arranged on the flap valve cover; the sleeve cooperates with the first trigger mechanism to limit the flap valve cover, so that the flap valve cover in an initial position is upright in the cavity of the pressure-retaining cylinder; the flap valve seat is sealedly connected to the pressure-retaining cylinder; and the flap valve cover and the flap valve seat are sealed via the first sealing ring.

3. The suction sampler system of claim 2, wherein the first trigger mechanism is arranged on a side wall of the pressure-retaining cylinder; the first trigger mechanism comprises a first trigger rod and a first trigger rope; one end of the first trigger rod is connected to the first trigger rope, and an other end of the first trigger rod passes through a mounting hole of the first trigger rod on the side wall of the pressure-retaining cylinder and inserts into the sleeve; and a second sealing ring is arranged between the first trigger rod and the mounting hole of the first trigger rod.

4. The suction sampler system claim 1, wherein the pressure compensation device is arranged on the side wall of the pressure-retaining cylinder; the pressure compensation device comprises a pressure-resistant cylinder, a piston, a compensator end cover and an inflation valve;
    the compensator end cover is sealedly arranged at a top opening of the pressure-resistant cylinder; the compensator end cover is provided with a through hole, and is connected to the cavity of the pressure-retaining cylinder through the high-pressure pipe; the piston is placed in the pressure-resistant cylinder; a bottom of the pressure-resistant cylinder is provided with an inflation hole; the inflation hole is connected to an inflation pipe; and the inflation pipe is provided with the inflation valve.

5. The suction sampler system of claim 1, wherein the cone component comprises a cone body, a screw rod, a driving bevel gear, a driven bevel gear, and a rocker; the plurality of beards are connected to one end of the screw rod, and an other end of the screw rod is connected to the driven bevel gear; the rocker is arranged on the side wall of the pressure-retaining cylinder along a radial direction of the pressure-retaining cylinder; an inner end of the rocker is provided with the driving bevel gear meshing with the driven bevel gear; and a rocker handle is provided on an outer end of the rocker.

6. The suction sampler system of claim 1, wherein the second seal mechanism comprises:
    a flap valve seat;
    a flap valve cover;
    a first sealing ring;
    a torsion spring; and
    a flap shaft;
    wherein the flap valve seat is provided with the second valve hole that communicates with the cavity of the pressure-retaining cylinder; the second valve hole is provided with the flap shaft; the flap valve cover is hinged with the flap valve seat through the flap shaft to form a hinge joint; a gear is at the hinge joint between the flap valve cover and the flap valve seat; the gear meshes with a rack; an inflation seat is arranged on a side wall of the pressure-retaining cylinder; a rack hole is arranged on the inflation seat; an outer end of the rack is placed in the rack hole; a second sealing ring is arranged between the rack and the rack hole; an inflation inlet is provided on a side wall of the inflation seat; the inflation inlet is connected to the rack hole; the torsion spring is arranged on the flap shaft; two ends of the torsion spring are respectively connected to the flap valve seat and the flap valve cover; and the flap valve seat and the pressure-retaining cylinder are sealed via the first sealing ring.

7. The suction sampler system of claim 1, wherein the semiconductor refrigeration component comprises two groups of semiconductor refrigeration components; a cross section of each of the two groups of semiconductor refrigeration components is a semicircular ring; the two groups of semiconductor refrigeration components are bonded to the outer wall of the pressure-retaining cylinder via thermally conductive silicone; the two groups of semiconductor refrigeration components form a structure with a circular cross section; each of the two groups of the semiconductor refrigeration components comprises a plurality stages of semiconductor refrigeration plates and an electrode holder; a cold end of each of the plurality stages of semiconductor refrigeration plates is connected to the outer wall of the pressure-retaining cylinder via a heat conductive plate; a hot end of each of the plurality stages of the semiconductor refrigeration plates is provided with a heat sink; the semiconductor refrigeration plate in each stage is connected to the electrode holder; and the electrode holders are connected in series through wires connected to the power supply in the circuit cylinder.

8. The suction sampler system of claim 7, wherein the semiconductor refrigeration plates are sandwiched between the heat conductive plate and the heat sink; a contact surface between the semiconductor refrigeration plate and the heat conductive plate, and a contact surface between the semiconductor refrigeration plate and the heat sink are both coated with thermally conductive silicone grease; the electrode holders and the semiconductor refrigeration components are connected to each other through wires; and each of the electrode holders and each group of the semiconductor refrigeration components are sealed via an O-ring.

9. The suction sampler system of claim 1, wherein the pipeline communicating an outlet of the collection cylinder with the second valve hole of the second seal mechanism is a hose; an inlet of the collection cylinder is an opening with a slope; an upper end of the collection cylinder is provided with a T-shaped handle; the collection cylinder is provided with a filter plate to provide passage of the deep-sea floor organisms within a pre-determined size range; a diameter of a filter hole on the filter plate is smaller than a diameter of the pipeline; and an inner diameter of the pressure-retaining cylinder is equal to an inner diameter of the pipeline.

* * * * *